Aug. 6, 1935.  O. C. DURYEA  2,010,391
HOPPER CAR
Filed June 11, 1930   9 Sheets-Sheet 2

Inventor
Otho C. Duryea
By Cameron, Kerkam & Sutton
Attorneys

Aug. 6, 1935. O. C. DURYEA 2,010,391
HOPPER CAR
Filed June 11, 1930 9 Sheets-Sheet 3

Inventor
Otho C. Duryea.
By Cameron, Kerkam & Sutton.
Attorneys

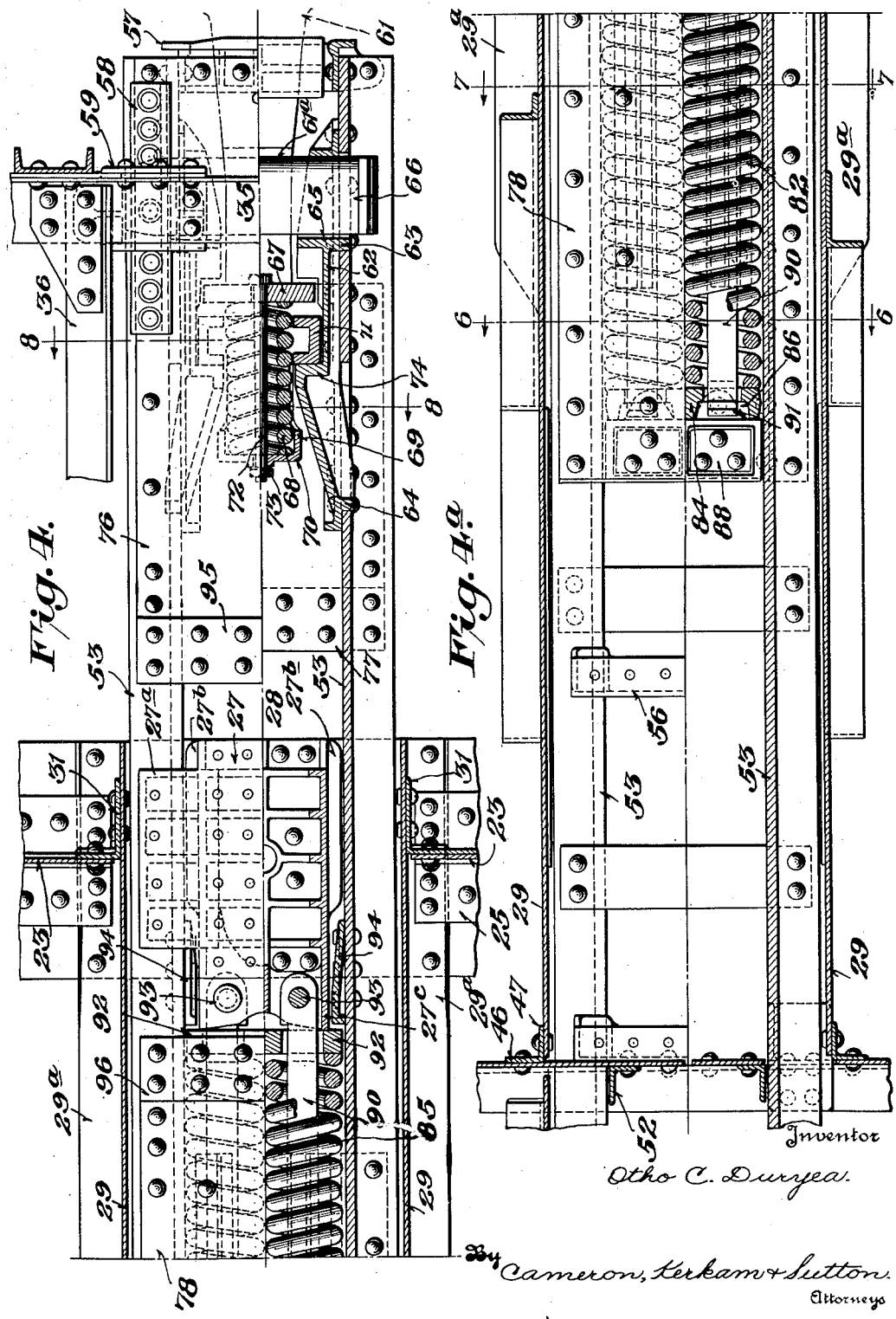

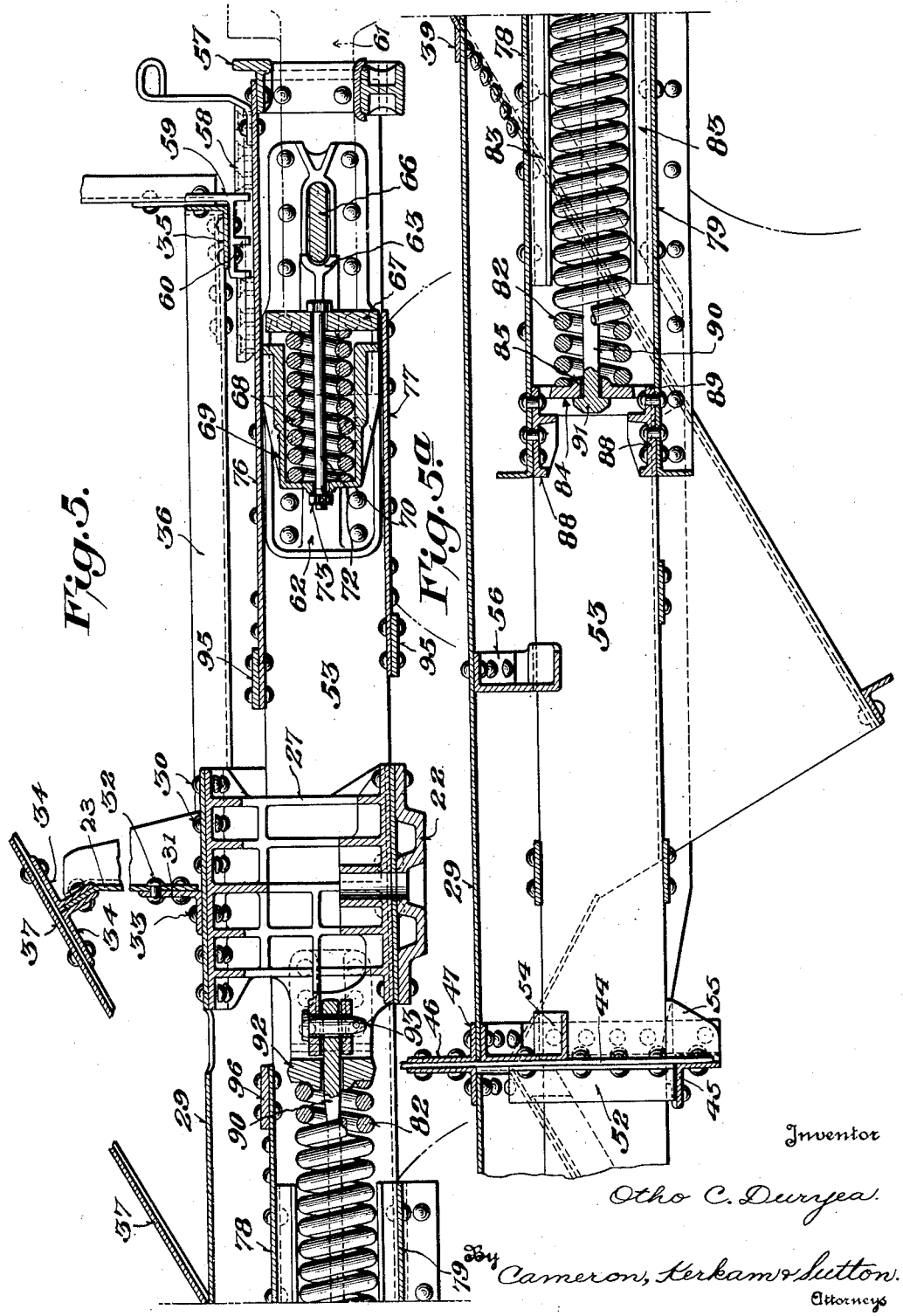

Aug. 6, 1935.  O. C. DURYEA  2,010,391
HOPPER CAR
Filed June 11, 1930  9 Sheets-Sheet 6

Inventor
Otho C. Duryea.

By Cameron, Kerkam & Sutton.
Attorneys

Aug. 6, 1935. O. C. DURYEA 2,010,391
HOPPER CAR
Filed June 11, 1930 9 Sheets-Sheet 7
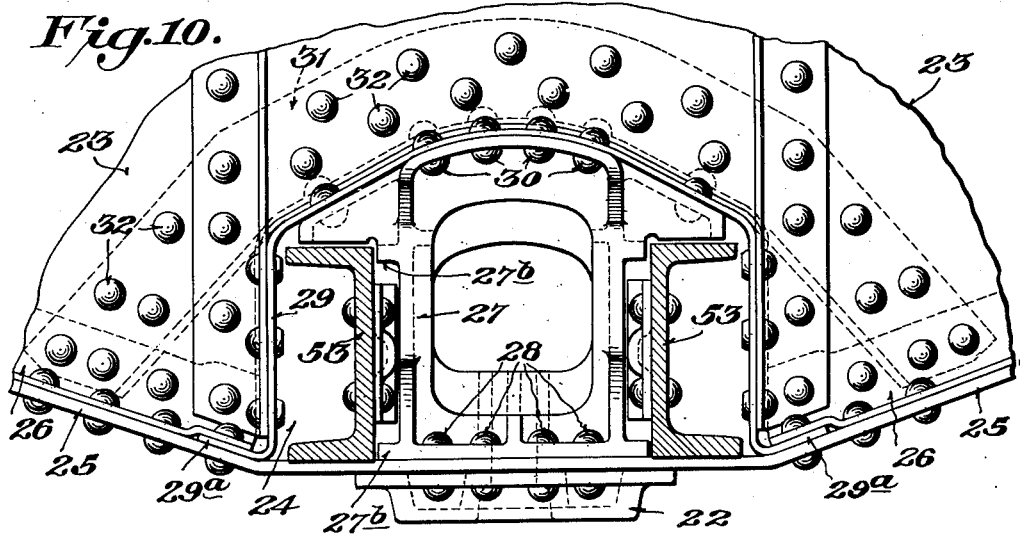
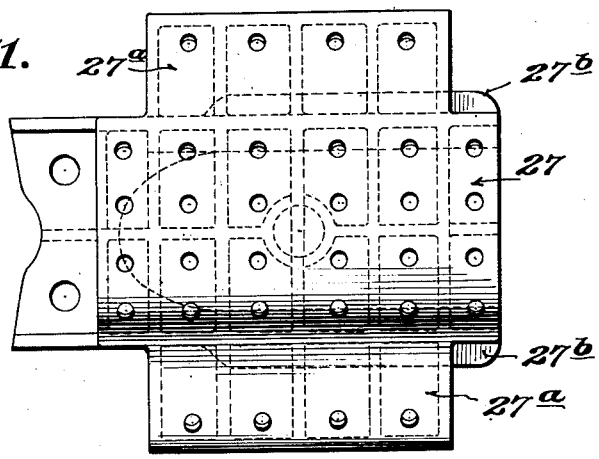
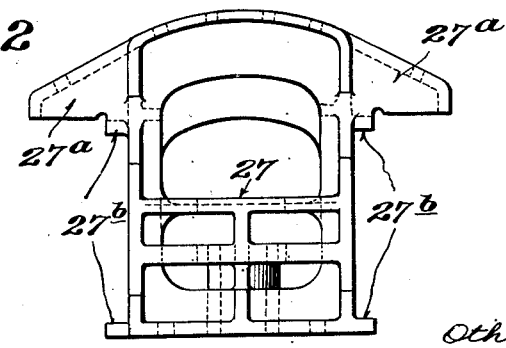

Aug. 6, 1935.  O. C. DURYEA  2,010,391
HOPPER CAR
Filed June 11, 1930  9 Sheets-Sheet 8
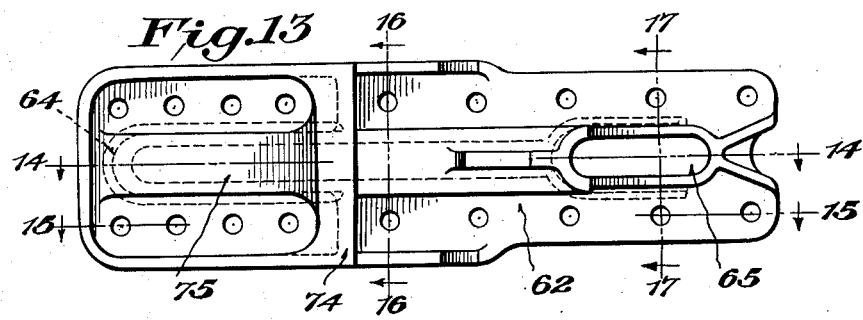
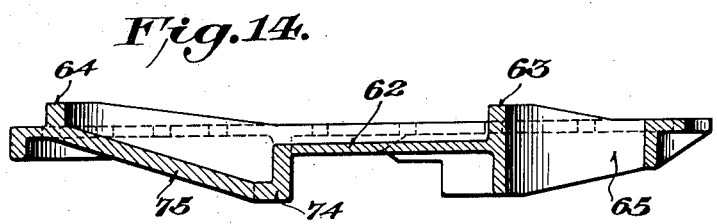
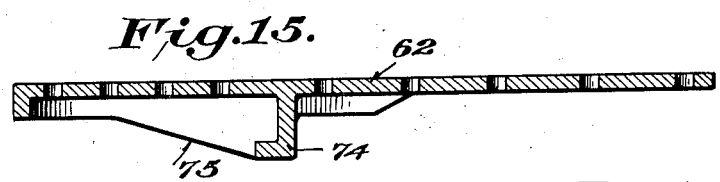
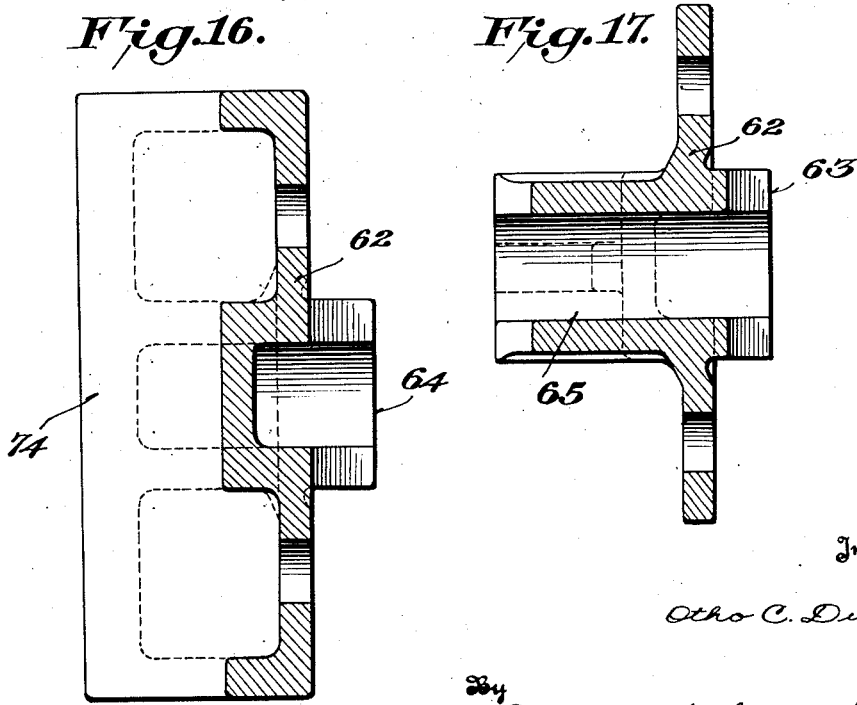
Inventor
Otho C. Duryea
By Cameron, Kerkam & Sutton
Attorneys Aug. 6, 1935.  O. C. DURYEA  2,010,391

HOPPER CAR

Filed June 11, 1930  9 Sheets-Sheet 9

Inventor
Otho C. Duryea.
By Cameron, Kerkam & Sutton.
Attorneys

Patented Aug. 6, 1935

2,010,391

UNITED STATES PATENT OFFICE 2,010,391

HOPPER CAR

Otho C. Duryea, Waterbury, Conn., assignor to O. C. Duryea Corporation, Wilmington, Del., a corporation of Delaware Application June 11, 1930, Serial No. 460,505

12 Claims. (Cl. 213—8)

This invention relates to railway cars and more particularly to a railway car embodying a center member constituting a draft and buffing column which extends substantially the length of the car and is mounted for movement relative thereto.

One of the objects of the invention is to provide a novel car structure embodying a relatively movable center member extending substantially the length of the same, said car structure being so constructed as to facilitate assembly and disassembly of the parts for the purposes of inspection, repairs, or replacements, etc., and to increase the strength and rigidity of the car structure.

Another object is to provide, in combination with a car structure embodying a continuous draft and buffing column, novel means for transmitting draft and buffing forces from coupler mechanism to said column.

Another object is to provide novel body bolster structure, in combination with a continuous draft and buffing column movable through said bolster.

A further object is to provide, in a car structure embodying a continuous draft and buffing column movable relative thereto, novel cross bearer structure embodying novel strengthening and stiffening means for the car structure.

Other objects are to provide, in a car structure embodying a longitudinally movable center member and couplers movable relative to the center member, a novel cheek plate casting for transmitting draft and buffing forces between said couplers and center member; a novel body bolster center brace; and novel strengthening or stiffening webs or plates associated with the cross bearers of the car structure. Other objects will appear more fully hereinafter.

One embodiment of the invention is illustrated in the accompanying drawings, wherein like reference characters refer to like parts throughout the several views, but it is to be expressly understood that these drawings are for purposes of illustration only and are not to be construed as a definition of the limits of the invention, reference being had to the appended claims for this purpose.

In the drawings—

Figure 1:
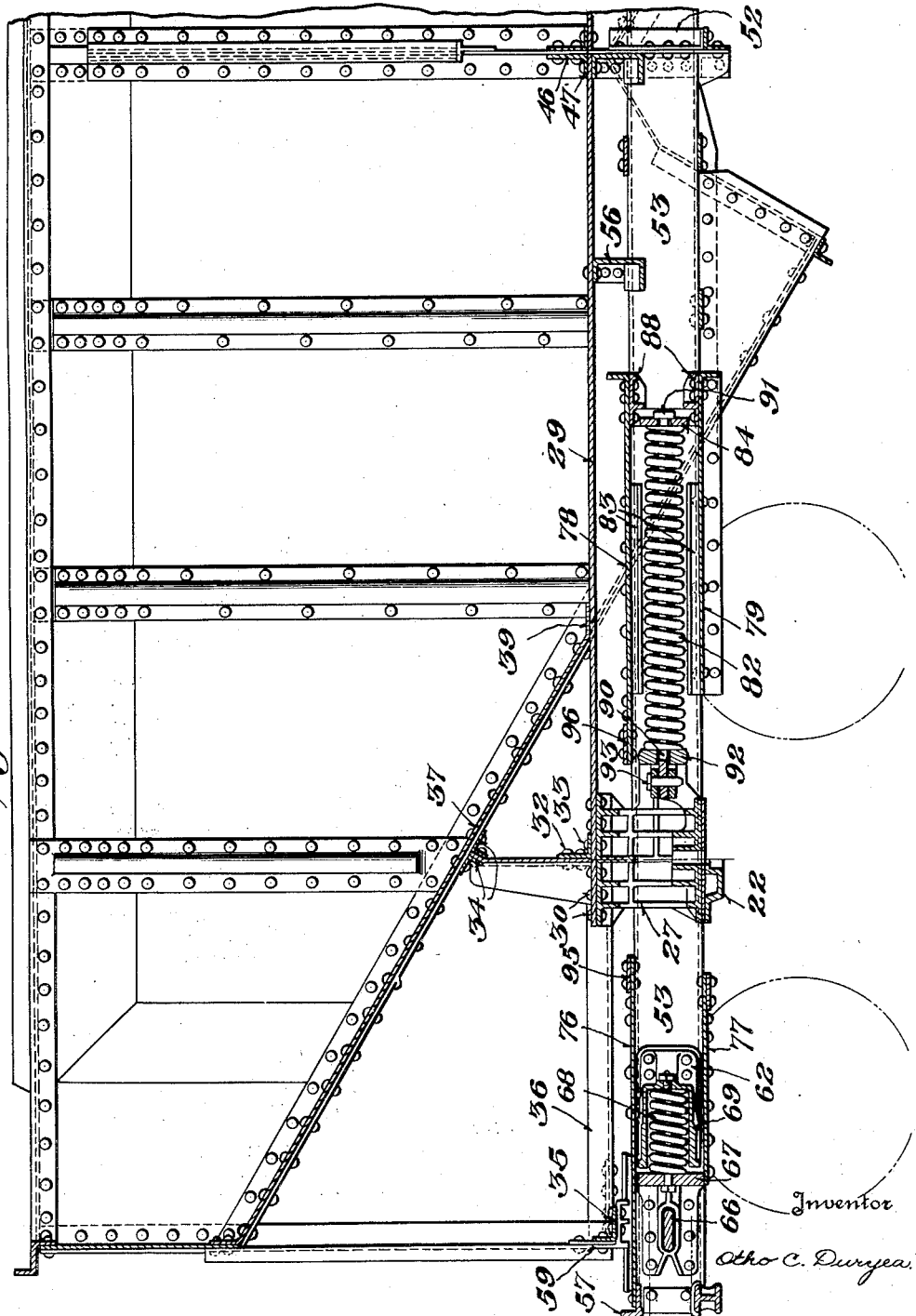
Fig. 1 is a side elevation, partly in section, and with parts broken away, of one end of a car structure embodying the invention, a portion only of the structure being shown in order to employ a large scale drawing.
Figure 9:
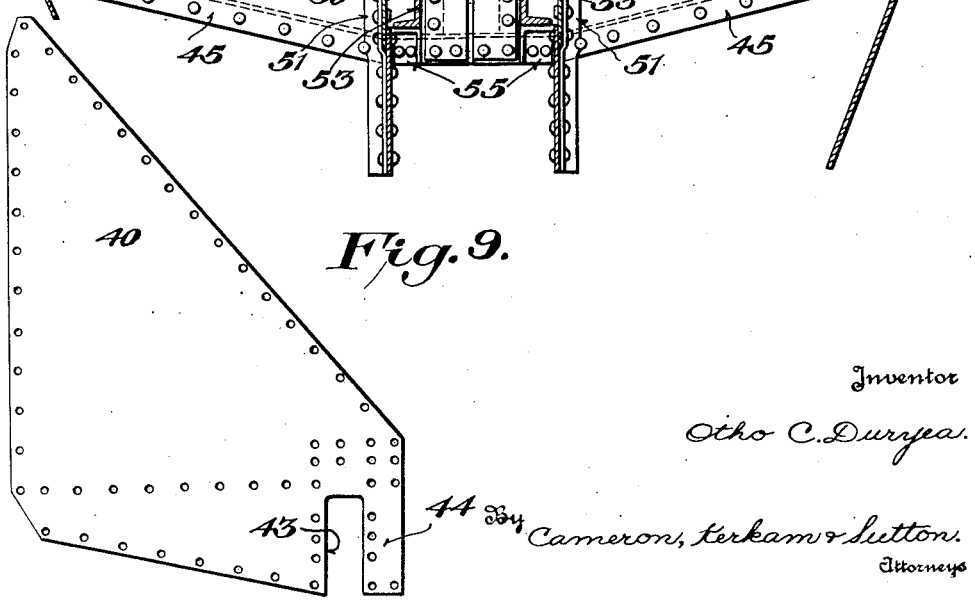
Figure 6:
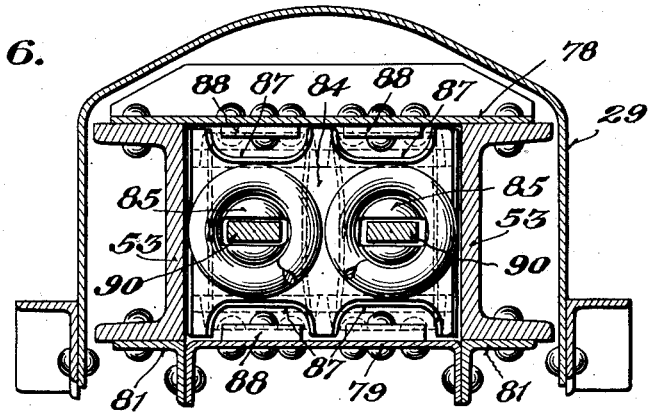
Figure 7:
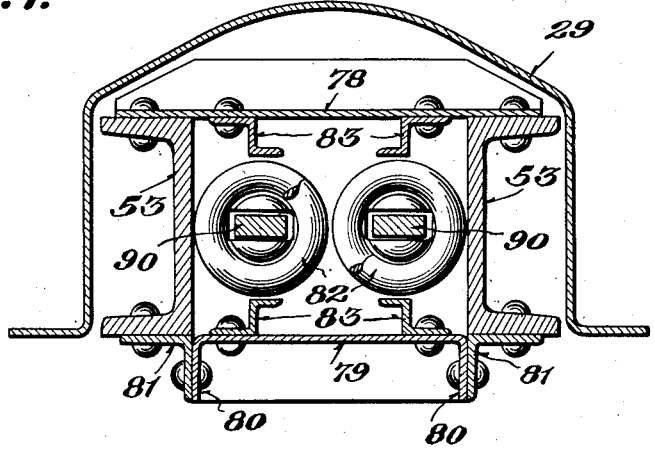
Figure 8:
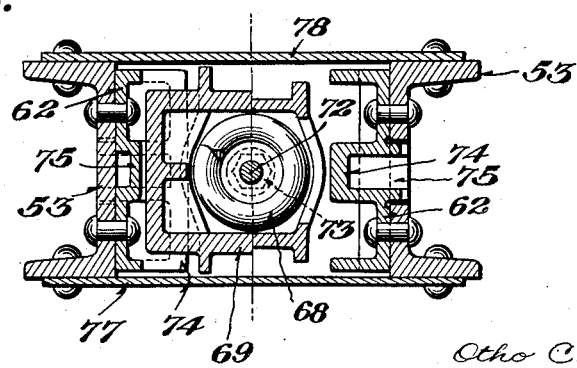
Figure 18:
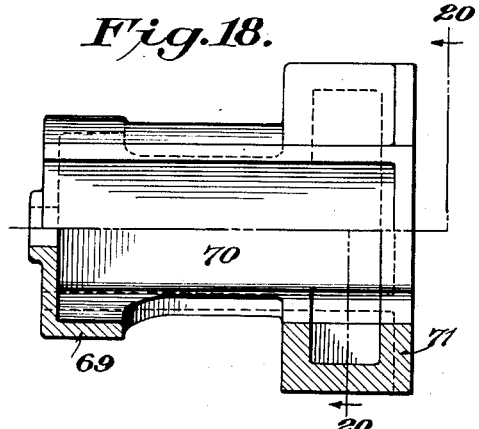
Figure 20:
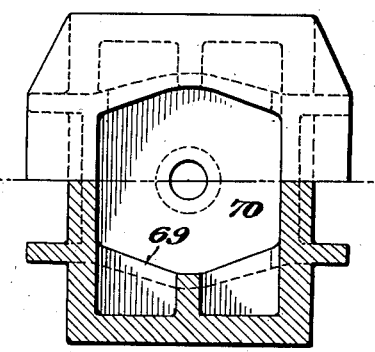
Figure 19:
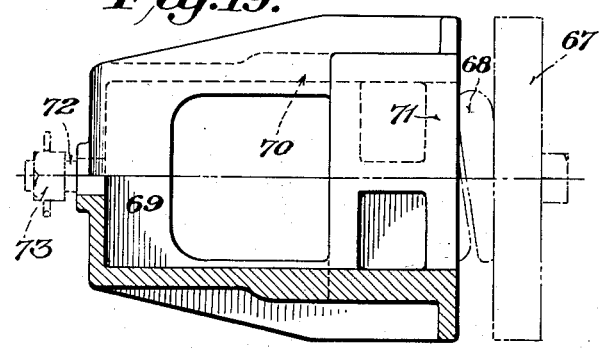
Figure 21:
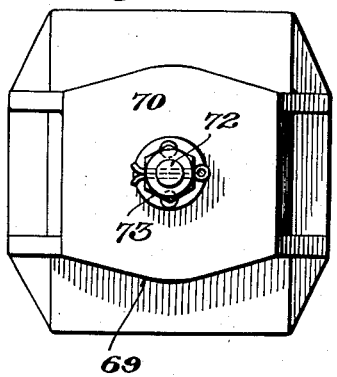
Figure 22:
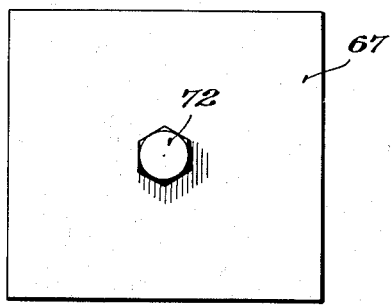

Figs. 4 and 4a constitute an enlarged plan view, partly in section and with parts broken away, of the car underframe shown in Fig. 1;

Figs. 5 and 5a constitute an enlarged side elevation, partly in section and with parts broken away, of the car underframe shown in Fig. 1;

Fig. 6 is a section on the line 6—6 of Fig. 4a;
Fig. 7 is a section on the line 7—7 of Fig. 4a;
Fig. 8 is a section on the line 8—8 of Fig. 4;
Fig. 9 shows a strengthening and stiffening web or plate;
Fig. 10 is an end view of the body bolster;
Figs. 11 and 12 are respectively plan and end views of a center brace member;
Fig. 13 is a side view of a cheek plate;
Figs. 14 and 15 are sections taken respectively on the lines 14—14 and 15—15 of Fig. 13;
Figs. 16 and 17 are sections taken respectively on the lines 16—16 and 17—17 of Fig. 13;
Fig. 18 is a plan view partly in section of a coupler spring housing;
Fig. 19 is a side view partly in section of the housing shown in Fig. 18;
Fig. 20 is a view taken on the line 20—20 of Fig. 18; and
Figs. 21 and 22 are respectively left and right hand end views of Fig. 19.

In the form shown in the drawings, the car structure embodying the present invention is of the hopper type, but it is to be expressly understood that the invention is not limited to hopper cars but is applicable to other types of cars, including box-cars, gondolas, etc. Since the opposite ends of the car are similarly constructed, only one end is illustrated.

The weight of the car structure is transferred to suitable trucks (not shown) through suitable center plates 22, one of which is shown secured to the lower central portion of a body bolster of the plate type. In the form shown said body bolster comprises a vertically disposed plate or diaphragm 23 that is provided in the lower central portion thereof with an opening 24 (Fig. 10) and is secured at its ends in any suitable manner to the side sills of the car body. Attached to the lower edge of the diaphragm 23 is a bottom cover plate 25 that extends the width of the car and is preferably secured to the diaphragm by means of rivets and suitable angles 26. Positioned within the opening 24 in the diaphragm is a center brace 27 (Figs. 10 to 12 inclusive) which is preferably formed as a casting. Rivets 28 preferably extend through center plate 22, bottom cover plate 25, and center brace member 27 to rigidly secure these parts together.

Means are provided for strengthening the body bolster against forces tending to twist the same about a horizontal axis. In the form shown, a longitudinal hood sheet 29, which preferably terminates at its outer end adjacent the outer face of center brace 27 as shown in Fig. 5, extends inwardly from the body bolster through the floor sheet of the car and is preferably suitably connected as described hereinafter with said floor sheet and with the cross bearers, said hood sheet extending if desired to the body bolster at the opposite end of the car structure. The upper surface of center brace 27 is curved as shown in Figs. 10 and 12 to conform to the inner curved surface of the hood sheet 29 and said center brace is preferably provided with laterally extending webs 27a, the hood sheet being rigidly secured to the curved surface of the center brace 27 and webs 27a by means of suitable rivets 30. A saddle angle 31 (Figs. 5 and 10) which rests on the top of hood sheet 29 is riveted at 32 to one face of the diaphragm 23 and is rigidly secured to the center brace 27 as by means of rivets 33 which pass through said saddle angle, hood sheet, and the upper portion of center brace 27. Diaphragm 23 is suitably secured as by means of angles 34 and suitable rivets to the floor sheet of the car structure (see Fig. 5).

The lower edges of the sides of the hood sheet 29, adjacent the body bolster, are flanged outwardly at 29a (Fig. 10) and are secured between bottom cover plate 25 and angles 26 by suitable rivets. Hood sheet 29 and diaphragm 23 constitute a rigid connection between the body bolster and the car structure and prevent twisting of the bolster, and the raised central portion of center brace 27 together with supporting webs 27a further strengthens the bolster and adds metal in a vertical direction to resist shearing stresses due to the fact that the load is transmitted to the bolsters through the side sills of the car.

The body structure includes an end sill 35 which may be braced by one or more angles 36 secured to said end sill and to the body bolster.

Figure 2:
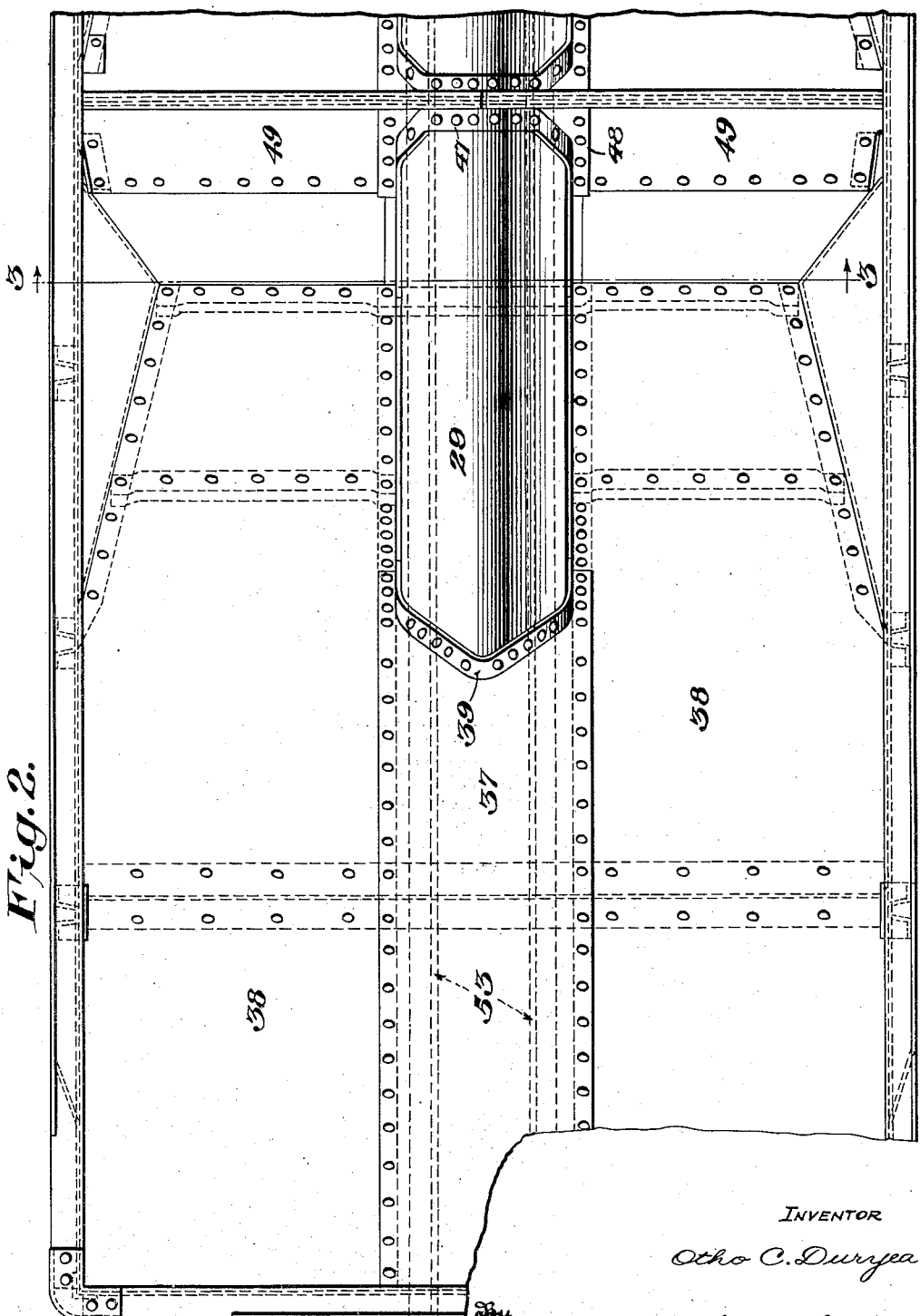
Fig. 2 is a top plan view of the structure shown in Fig. 1.

Hood sheet 29 where it passes through the floor sheet of the car is secured to said floor sheet in any suitable manner so as to form a tight connection. In the form shown, the end floor sheet of the car is formed in three sections, a central portion 37, and two side portions 38 which are secured to the car sides in any suitable manner. The central portion 37 and the two side portions 38 may overlap and may be secured together in any suitable manner as by riveting (Fig. 2). The central portion 37 terminates at the hood sheet, the inner end being shaped to fit closely around the hood sheet and being provided with a bent flange 39 preferably riveted to the hood sheet.

Figure 3:
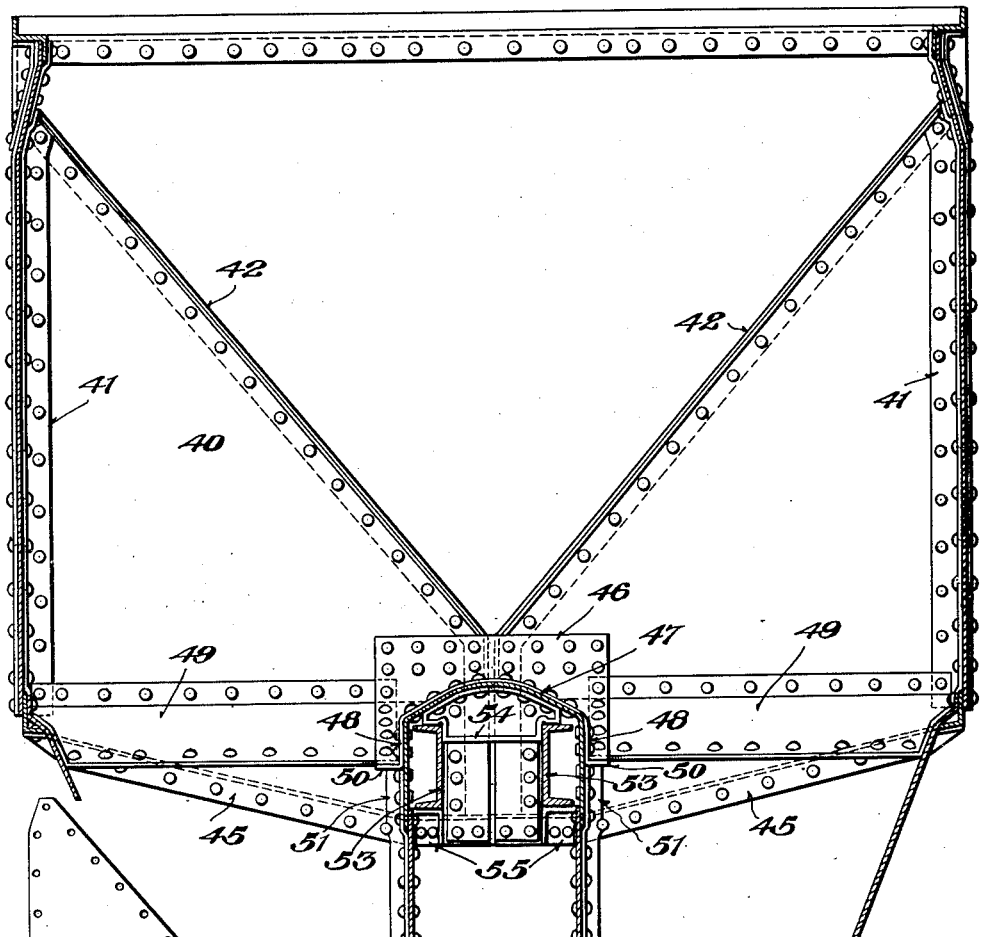
Fig. 3 is a view taken on the line 3—3 of Fig. 2.

Intermediate the bolsters at its opposite ends, the car structure is supported by one or more cross bearers of suitable construction with which hood sheet 29 is rigidly connected, said hood sheet being preferably cut at the cross bearer and the two ends of the hood sheet adjacent the cross bearer being secured thereto in any suitable manner. The cross bearer structure preferably embodies novel strengthening means, including gusset plates rigidly secured to the car sides and to the hood sheet and stiffened by suitable angles or the like, said gusset plates preferably having the form shown in Fig. 9 wherein a generally triangular plate 40 is shown. Gusset plates 40 are preferably employed in pairs as seen in Fig. 3 and are disposed in a vertical plane transverse to the car structure, said plates being secured to the car sides in any suitable manner as by means of angles 41 and suitable rivets and the inner inclined edges of said plates being stiffened by suitable angles 42 or the like. Each gusset plate 40 is preferably provided adjacent its lower central corner with a slot 43 for a purpose described hereinafter, leaving a tongue-like projection 44. The bottom edges of each pair of plates 40 are strengthened and rigidly secured together, preferably by means of an angle 45 and suitable rivets.

The outer section of hood sheet 29 terminates adjacent the gusset plates 40 and is secured to said plates preferably by means of a saddle having a vertical portion 46 riveted to said gusset plates, a curved portion 47 shaped to fit the upper surface of the hood sheet and riveted thereto, and downwardly extending side portions 48 riveted to the sides of said hood sheet. Cross ridge sheets 49 are preferably riveted to gusset plates 40 at their upper edges while their inner edges are preferably riveted to laterally extending portions 50 of the saddle. Preferably the sides of hood sheet 29 are also secured to gusset plates 40 by means of angles 51, and the projections 44 of said gusset plates are further strengthened by suitable angles 52. The connection between the inner hood section, cross ridge sheets and gusset plates, on the opposite side of gusset plates 40 may be made by a saddle in a manner similar to that described above. The cross ridge gusset plates 40 are thus rigidly connected with the car structure and with the longitudinal hood sheet to constitute a transverse section of the car structure having great strength and rigidity.

Extending substantially the length of the car structure within the hood sheet 29 is a longitudinally movable center member or draft and buffing column that is mounted for longitudinal movement in both directions relative to the car body structure. In the form shown, said center member is constituted by two vertically disposed channels 53 which are suitably secured together as by means hereinafter described. The channels 53 pass through the opening 24 in the body structure and their lower flanges have sliding engagement with bottom cover plate 25, vertical movement of the channels being prevented by webs 27a of center brace 27. Lateral movement of the channels at the bolster is prevented by laterally extending webs 27b formed on center brace 27 adjacent the upper and lower edges of the webs of channel 53. At the cross bearers, channels 53 pass through the slots 43 in gusset plates 40 and are guided both vertically and horizontally by a guide member 54 preferably formed as a casting and riveted to hood sheet 29 as shown in Fig. 3. Preferably supports 55 which may be castings are riveted to the cross bearer structure adjacent the lower flanges of channels 53, as also seen in Fig. 3. Intermediate the bolsters and cross bearers, one or more guides 56 similar to guide 54 may be riveted to hood sheet 29.

Secured to the outer ends of channels 53 is a striking plate 57 which may be formed as a casting if desired, and suitable means are preferably provided for supporting and guiding the center member at the end sill 35. In the form shown, T-shaped guides 58 are secured in any suitable manner as by riveting to the upper flanges of channels 53 and suitable guides 59 are secured as by means of rivets to end sill 35 and are provided with lugs 60 which engage under the enlarged T-shaped heads of guides 58.

A coupler 61 is suitably connected to the center member and is adapted for limited inward movement relative thereto, suitable resilient means such as a coil spring being preferably employed to yieldingly resist such inward movement. Preferably said coupler is connected to the center member through suitable cheek plates 62 which may be castings if desired and are secured to the channels 53, said cheek plates being formed to support said resilient means and constituting means for transmitting draft and buffing forces from said coupler to said center member. The preferred form of cheek plates is shown in Figs. 13 to 17 inclusive, said cheek plates being employed in pairs, as shown in Fig. 4. One side of each cheek plate is substantially flat so as to lie flush against the flat inner surfaces of the webs or channels 53, except for projecting portions 63 and 64 which project through correspondingly shaped openings in the channel webs, said cheek plates being rigidly secured to said webs over substantially their entire area by suitable rivets. Each cheek plate is provided with an elongated opening 65 through which passes a coupler key 66 that extends through an opening 61a in the coupler shank. Both openings 65 and 61a are slightly larger than key 66, and as shown in Fig. 4, coupler 61 holds key 66 against the outer side of opening 65 to transmit draft forces to the center member, but said coupler is capable of limited inward movement relative to the center member the extent of which is determined by the sum of the difference in size of opening 61a and key 66 and the difference in size of openings 65 and key 66.

The inner end of coupler 61 bears against a follower plate 67 which cooperates with a suitable coil spring 68 to resist said relative inward movement. Spring 68 is mounted in a suitable housing 69, preferably having the form shown in detail in Figs. 18 to 21 inclusive, said housing as shown being provided with a pocket 70 in which spring 68 is seated and also with a suitable enlarged head 71, adapted as hereinafter described to transmit buffing forces to cheek plates 62, said head constituting a transverse beam which is strengthened against bending by the rigid parts forming pocket 70. A headed rod 72 passes through plate 67 and spring 68 and extends through the bottom of pocket 70, the parts being held in assembled relation by a nut 73 on the inner end of said rod. Spring 68 in its normal position is longer than the axial length of housing 69 so that by adjusting nut 73 said spring may be placed under initial compression.

As will be seen from Figs. 20 and 21, the enlarged head 71 of housing 69 is substantially rectangular and is provided with flat sides. Referring to Figs. 13 to 17, the side of cheek plate 62 opposite that on which projections 63 and 64 are formed is provided with a transverse projection or stop 74 and with strengthening ribs 75, and as seen in Fig. 4, spring housing 69 is supported between the two cheek plates with its enlarged head bearing against the projections 74 of said cheek plates by reason of the initial compression of the spring 68 which is held at one end by coupler 61 and key 66. Housing 69 is centered between the cheek plates by ribs 75, and the entire coupler mechanism is enclosed by channels 53 and top and bottom cover plates 76 and 77. Spring 68 maintains coupler 61 in its outermost position as shown in Fig. 4 wherein the inner edge of coupler key slot 61a engages and holds key 66 in its outermost position against the outer end of openings 65, and said spring yieldingly resists inward displacement of coupler 61 relative to cheek plate 62 and to the center member.

Means are provided for yieldingly resisting longitudinal movement of the center member relative to the car structure whereby draft or buffing forces imparted to said center member and car structure through the coupler are yieldingly absorbed without damage to said structure. Preferably, said yielding means is adapted for long travel much greater than the travel of the coupler relative to the center member. In the form shown, top and bottom cover plates 78 and 79 respectively are secured to channels 53 and constitute a housing for said yielding means, top cover plate 78 being preferably riveted to the upper flanges of said channels and bottom cover plate 79 having down-turned flanges 80 (Fig. 7) secured to the lower flanges of channels 53 by angles 81 and suitable rivets. A pair of coil springs 82 are positioned within the housing formed by channels 53 and cover plates 78 and 79 and are preferably maintained in proper position in said housing by means such as Z-bars 83 secured to the cover plates. Springs 82 bear at their innermost ends on a substantially rectangular follower plate 84 that is provided on its side adjacent said springs with spring centering bosses 85. The opposite side of said follower plate is provided with two vertically extending recesses 86 (Fig. 4a) and the top and bottom edges of said follower plate are each notched at two points 87, as seen in Fig. 6. Follower plate 84 bears against follower stops 88 which as shown are four in number and are preferably rigidly secured two to the top cover plate 78 and two to the bottom cover plate 79 by suitable rivets, said stops being preferably provided with projections 89 (Figs. 4a and 5a) which extend within notches 87 in the edges of the follower plate 84.

Means are provided for connecting follower plate 84 with the body bolster, and preferably with the center brace 27. In the form shown a pair of links 90 which lie within the coils of springs 82 extend at their inner ends through openings in follower plate 84 and are provided with enlarged heads 91 seated in recesses 86. At their outer ends, links 90 pass through openings in a follower plate 92 which is generally rectangular in shape and is positioned between channels 53 and the top and bottom cover plates 78 and 79, and are connected by pins 93 with center brace 27. Follower plate 92 is normally held by springs 82 in engagement with projections 27c of center brace 27. As seen in Fig. 4, a pair of stops 94 are secured to the inner faces of channels 53 adjacent the center brace 27. In the normal position of the parts as shown in Fig. 4, stops 94 do not engage the follower plate 92.

Suitable means are provided for positively limiting the extent of movement of the center member with respect to the car structure which means in the form shown comprises stop and tie plates 95 secured to the upper and lower flanges of channels 53 outwardly of the body bolster, and a stop and tie plate 96 secured to the upper flanges of channels 53 inwardly of the body bolster, said plates 95 and 96 being adapted to engage center brace member 27 to limit the movement of the center member with respect to the car body.

*Operation.*—Considering first only one end of the car, when a draft force is applied to coupler 61 tending to move it to the right as viewed in Figs. 4 and 5, this force is transmitted through key 66 and cheek plate 62 to the center member 53, 53. In the normal position of the parts, as shown in Figs. 4 and 5, coupler 61 is in its outermost position and coupler key 66 is in engagement with the forward end of openings 65 in the cheek plates, so that no lost motion takes place. Movement of the center member 53, 53 is transmitted through top and bottom cover plates 78 and 79 and follower stops 88 to follower plate 84, tending to displace said follower plate toward the body bolster and thereby to compress springs 82 against follower plate 92 which rests against center brace 27. The draft force is thus yieldingly resisted and absorbed without shock or damage to the structure due to the long travel of the resisting means, which is limited only by engagement of stop and tie plate 96 with said center brace.

If a buffing force is exerted on coupler 61 tending to move it to the left as seen in Figs. 4 and 5, coupler 61 moves to the left relative to key 66 to the extent permitted by opening 61a and key 66 moves to the left in the openings 65 of the cheek plates, this movement being yieldingly resisted by spring 68 which is compressed by reason of the engagement of coupler 61 with follower plate 67 while spring housing 69 is held stationary by engagement of its enlarged head 71 with stops 74 of the cheek plates. The extent of permitted movement of coupler 61 relative to the center member, which as above explained is determined by the size of openings 61a and 65, is preferably equal to the extent of movement of follower plate 67 which can take place before it goes solid against head 71. When this occurs, the buffing force is transmitted through cheek plates 62 to the center member 53, 53 causing said center member to move to the left relative to the body bolster and car structure. Stops 94 move to the left into engagement with follower plate 92 and then move said follower plate to compress springs 82 against follower plate 84 which is held against movement by links 90 connected to center brace 27. The compression springs 82 yieldingly resist movement of the center member relative to the car body so that the buffing force is cushioned without shock or damage to the car structure, in view of the long travel permitted before stop and tie plates 95 engage center brace 27.

It will be understood that a draft force at one end of the car is equivalent to a buffing force at the other end, and vice versa, so that the cushion gears at both ends of the car resist movement of the center member in either direction simultaneously.

The present invention provides a novel car structure, of the type embodying a longitudinally movable continuous draft and buffing column, wherein the various parts are so constructed and designed as to provide maximum strength and rigidity without undue increase in weight. The center brace 27, for example, is designed to provide maximum area for attachment of the hood sheet 29 thereto, whereby twisting stresses on the bolster are resisted. Moreover, the increase in vertical height of the center brace and the laterally extending web add material in a vertical plane to compensate for material removed to form openings for the passage of the center member. The cross ridge structure is similarly designed to provide great strength, the gusset plates 40 and hood sheet being assembled into a rigid transverse section.

Attention is called to the novel means whereby draft and buffing forces are transmitted from the couplers to the center member. This construction is economical in material and cost and is easy to manufacture. Moreover, the strength of this construction is considerably greater than previous constructions wherein the coupler housing has been merely riveted to the channels of the center member. The cheek plates provide a large amount of material in the direction in which the forces act, are secured to the channels over a very large area, and moreover do not depend entirely on rivets because of the lateral cheek plate projections which engage openings in the channel webs. The coupler spring housing which constitutes a transverse beam for transmitting buffing forces to the center member, is strengthened against bending by the spring pocket structure and associated parts.

Attention is likewise called to the arrangement of the spring housing and follower stops. Follower stops 88 are secured to the top and bottom cover plates so that springs 82 and follower plates 84 and 92 may be easily removed for purposes of inspection, repairs, replacements, etc. Heretofore when the follower stops have been placed on the webs of the channels forming the center member, it has been very difficult to reach these parts and to disassemble the cushion gear. With the present invention, pins 93 may readily be removed through an opening in the hood sheet 29, directly above said pins, as seen in Fig. 5, bottom cover plate 79 may be removed by cutting out the rivets securing flanges 80 to angles 81, and the entire cushion gear may be taken out.

The above and many other advantages will be apparent to those skilled in the art. It is to be understood, however, that the invention is not limited to the form described and illustrated in the drawings. Various changes may be made in the details of construction and arrangement of the parts, while the form of the individual elements may be altered without departing in any way from the spirit of the invention. Reference is therefore to be had to the appended claims for a definition of the limits of the invention.

What is claimed is:

1. In a car structure of the type embodying a long travel draft and buffing column extending substantially the length of said structure and longitudinally movable relative thereto, said column including a pair of spaced members, cover plates connecting said members and forming therewith a housing, resilient cushioning means positioned in said housing and having one end operatively connected to said car structure, follower means cooperative with the other end of said resilient means, and follower stops secured to said cover plates and cooperating with said follower means.

2. In a car structure of the type embodying body bolsters and a draft and buffing column extending substantially the length of said structure and longitudinally movable relative thereto, said column including a pair of spaced channels, top and bottom cover plates secured to said channels and forming therewith a housing, resilient cushioning means in said housing and operatively connected at one end with one of said body bolsters, a follower plate for the other end of said resilient means and follower stops secured to said top and bottom cover plates and cooperating with said follower plates.

3. In a car structure of the type embodying body bolsters and a longitudinally movable draft and buffing column extending substantially the length of said car structure through openings in said body bolster, a longitudinal hood sheet rigidly secured to said car structure and within which said column extends, body bolster structure including a center brace member and having openings on each side of said center brace member, said column including spaced members passing slidably through said openings, and laterally projecting web portions on said center brace member overhanging said openings, the upper surface of said center brace member and web portions and said hood sheet being correspondingly shaped and rigidly secured together on substantially their entire engaged area.

4. In a car structure of the type embodying body bolsters and a longitudinally movable draft and buffing column extending substantially the length of the car structure through said body bolsters, a body bolster structure including a vertically disposed diaphragm having an opening therein and rigidly secured to said car structure, a center brace member positioned centrally in said opening leaving openings on each side thereof, said column including spaced members passing slidably through said openings, web portions on said center brace member extending laterally over said spaced members, and a longitudinal hood sheet rigidly secured to said car structure and within which said column extends, the surface of said center brace member and web portions and said hood sheet being correspondingly shaped and being riveted together over substantially their entire engaged area.

5. In a car structure of the type embodying a continuous draft and buffing column extending substantially the length of the car structure and movable relatively thereto, cross bearer structure including transverse supporting means for the car structure, and strengthening means including a pair of gusset plates, said strengthening means being rigidly secured to the car structure and to said transverse supporting means and constituting a rigid transverse section of said car structure, the inner edges of said pair of plates abutting one another and each of said gusset plates being provided with an upwardly extending opening in the bottom edge thereof adjacent the inner edge for the passage of said column, and supporting means secured to the cross bearer structure and closing the bottoms of said openings for slidably supporting said column.

6. In a car structure of the type embodying a continuous draft and buffing column extending through substantially the length of the car structure and movable relatively thereto, a transverse support for the car structure, and a pair of gusset plates rigidly secured to the car structure and to the support and constituting a rigid transverse stiffening web, the inner edges of said pair of plates abutting one another and each of said plates having an upwardly extending opening in the bottom edge thereof adjacent the inner edge, said column including a pair of spaced members each passing slidably through one of said openings.

7. In a car structure of the type embodying a continuous draft and buffing column extending substantially the length of the car structure and movable relatively thereto, a transverse support for the car structure, a pair of gusset plates rigidly secured to the car structure and to the support and disposed in a plane transverse to the car structure, each of said plates having an opening therein and said column including a pair of spaced members each passing through one of said openings, and a longitudinal hood sheet within which said column extends, said hood sheet being rigidly secured to said plates.

8. In a car structure of the type embodying cross bearer structure and a long travel continuous draft and buffing column extending substantially the length of the car structure and movable relatively thereto, means for strengthening said car structure including a pair of gusset plates of substantially triangular shape, the short sides of which are adapted to be secured rigidly to said car structure and to said cross bearer structure, and each of said plates being provided in its lower short side with an upwardly extending opening for the passage of said column.

9. In a car structure of the type embodying a long travel draft and buffing column extending substantially the length of said structure and longitudinally movable relative thereto, said column including a pair of spaced members, a top cover plate secured to said spaced members, a bottom cover plate having down-turned flanges, angles securing said flanges to said spaced members, resilient cushioning means positioned between said spaced members and cover plates and having one end operatively connected to the car structure, follower means cooperating with the other end of said resilient means, and follower stop secured to said cover plates and cooperating with said follower means.

10. In a car structure of the type embodying body bolsters and a draft and buffing column extending substantially the length of said structure and longitudinally movable relative thereto, said column including a pair of spaced channels, top and bottom cover plates secured to said channels and forming therewith a housing, resilient cushioning means in said housing and operatively connected at one end with one of said body bolsters, and stop means carried by one of said cover plates and constituting follower stop means to engage said cushioning means at the other end thereof and stop means to engage one of said bolsters and to limit positively the movement of said center member.

11. In a car structure of the type embodying a continuous draft and buffing column extending through substantially the length of the car structure and movable relatively thereto, a transverse support for the car structure, and a pair of gusset plates rigidly secured to the car structure and to the support and constituting a rigid transverse stiffening web, the inner edges of said pair of plates abutting one another and each of said plates having an upwardly extending opening in the bottom edge thereof adjacent the inner edge, said column including a pair of spaced members each passing slidably through one of said openings, and a strengthening member secured to and connecting the lower edges of said gusset plates.

12. In a car structure of the type embodying a continuous draft and buffing column extending substantially the length of the car structure and movable relatively thereto, a transverse support for the car structure, a pair of gusset plates rigidly secured to the car structure and to the support and disposed in a plane transverse to the car structure, the inner edges of said pair of plates abutting one another and each of said plates having an upwardly extending opening in the bottom edge thereof adjacent the inner edge, said column including a pair of spaced members each passing slidably through one of said openings, and a longitudinal hood sheet within which said column extends, said hood sheet being rigidly secured to said plates, and a strengthening member secured to and connecting the lower edges of said gusset plates.

OTHO C. DURYEA.